US012687376B2

(12) United States Patent
Lee

(10) Patent No.: US 12,687,376 B2
(45) Date of Patent: Jul. 21, 2026

(54) METHOD, COMPUTER PROGRAM, AND DEVICE FOR IDENTIFYING HIT LOCATION OF DART PIN

(71) Applicant: Phoenixdarts Co., Ltd., Seoul (KR)

(72) Inventor: Seung Yoon Lee, Seoul (KR)

(73) Assignee: PHOENIXDARTS CO., LTD., Seoul (KR)

( * ) Notice: Subject to any disclaimer, the term of this patent is extended or adjusted under 35 U.S.C. 154(b) by 336 days.

(21) Appl. No.: 18/450,832

(22) Filed: Aug. 16, 2023

(65) Prior Publication Data

US 2024/0060752 A1 Feb. 22, 2024

(30) Foreign Application Priority Data

Aug. 16, 2022 (KR) ........................ 10-2022-0102248

(51) Int. Cl.
*F41J 5/02* (2006.01)
*G06T 7/73* (2017.01)

(52) U.S. Cl.
CPC ................... *F41J 5/02* (2013.01); *G06T 7/75* (2017.01); *G06T 2207/30221* (2013.01)

(58) Field of Classification Search
None
See application file for complete search history.

(56) References Cited

U.S. PATENT DOCUMENTS 12,392,585 B2 * 8/2025 Lee ........................... F41J 5/056
2017/0307341 A1 * 10/2017 Hollinger ................... F41J 5/14

2018/0043229 A1 * 2/2018 Stemle ............... A63B 24/0021
2019/0318499 A1 * 10/2019 Li .............................. G06T 7/55
2020/0265231 A1 * 8/2020 Li .......................... G06V 20/64

FOREIGN PATENT DOCUMENTS

| EP | 3251732 A1 | 12/2017 |
|---|---|---|
| KR | 1020160110060 A | 9/2016 |
| KR | 1020180086808 A | 8/2018 |
| KR | 1020200042077 A | 4/2020 |
| KR | 102136813 B1 | 7/2020 |
| KR | 102245851 B1 | 4/2021 |
| KR | 1020220015496 A | 2/2022 |
| KR | 1020220040433 A | 3/2022 |
| KR | 102416372 B1 | 7/2022 |

OTHER PUBLICATIONS

European Patent Office, Search Report, Nov. 30, 2023.

* cited by examiner

*Primary Examiner* — Sunit Pandya
(74) *Attorney, Agent, or Firm* — Umberg Zipser LLP

(57) ABSTRACT

Disclosed is a computer program stored in a computer-readable storage medium, the computer program providing a dart pin hit location identification method when being executed by one or more control units of a dart game device, the method including: obtaining at least two dart target photographing images in response to a dart pin throw, in which the dart target photographing image includes an image of a dart target and at least one dart pin hitting the dart target; and generating, by a dart pin location identification network model, hit location information of the at least one dart pin based on the at least two dart target photographing images.

9 Claims, 10 Drawing Sheets

10000

3000
DART GAME SERVER

4000

1000
DART GAME
APPARATUS

NETWORK

2000a
DIFFERENT DEVICE

2000b
DIFFERENT DEVICE        2000

2000c
DIFFERENT DEVICE

1

METHOD, COMPUTER PROGRAM, AND DEVICE FOR IDENTIFYING HIT LOCATION OF DART PIN

CROSS-REFERENCE TO RELATED APPLICATIONS

This application claims priority to and the benefit of Korean Patent Application No. 10-2022-0102248 filed in the Korean Intellectual Property Office on Aug. 16, 2022, the entire contents of which are incorporated herein by reference.

TECHNICAL FIELD

The present disclosure relates to image processing using a computing device, and particularly, to a method, a computer program, and a device for generating a training dataset for identifying a hit location of a dart pin.

BACKGROUND ART

In general, a dart means a "little arrow" and is a game of throwing arrow-shaped darts at a centrifugal target labeled with numbers to score points. The dart game has the advantage that anyone can play at any time when arrowhead-shaped darts and a dart game apparatus are provided. In recent years, the dart game has developed into a global leisure activity with the development of various competition methods and the organization of scoring methods, and people of all ages easily enjoy the game.

A dart game apparatus may identify a hit location of a dart pin hitting on a dart target by analyzing an image sensed by a sensor installed on the dart target or an image taken of the dart target. The image analysis method need to process images taken from cameras at various locations. The image analysis method that use rule-based algorithms has a problem in that it is difficult to secure accuracy due to noise, because dart game apparatuses are in various installation environments. The image analysis method based on deep learning has the problem, such as the difficulty of securing a large enough dataset and implementing algorithms to process the hit locations of multiple dart pins.

PRIOR ART LITERATURE

Patent Document

[Patent Document 1] Korean Patent No. 10-2136813

SUMMARY OF THE INVENTION

The present disclosure is conceived in response to the foregoing background art, and provides a method, a computer program, and a device for generating a training dataset for identifying a hit location of a dart pin.

The technical objects of the present disclosure are not limited to the foregoing technical objects, and other non-mentioned technical objects will be clearly understood by those skilled in the art from the description below.

An exemplary embodiment of the present disclosure provides a computer program stored in a computer-readable storage medium, the computer program providing a dart pin hit location identification method when being executed by one or more control units of a dart game device, the method including: obtaining at least two dart target photographing images in response to a dart pin throw, in which the dart target photographing image includes an image of a dart target and at least one dart pin hitting the dart target; and generating, by a dart pin location identification network model, hit location information of the at least one dart pin based on the at least two dart target photographing images.

Alternatively, the generating of the hit location information of the dart pin based on the at least two dart target photographing images may include: generating input data by performing a merging operation on the at least two dart target photographing images; and generating the hit location information of the at least one dart pin by processing the input data by the dart pin location identification network model.

Alternatively, the input data may include at least two bounding box images corresponding to the at least two dart target photographing images.

Alternatively, the input data may be an image of the at least two bounding box images arranged in predetermined directions.

Alternatively, the dart pin location identification network model may be trained by using a training dataset including training image data including at least two dart target photographing images or at least two bounding box images, and a label corresponding to the training image data.

Alternatively, the label corresponding to the training image data may include at least one of segment location information or segment bit location information.

Alternatively, the at least two dart target photographing images may be generated by at least two cameras, each positioned in a predetermined direction.

Alternatively, the number of the at least two dart target photographing images may correspond to the number of the at least two cameras.

Alternatively, the generating of, by the dart pin location identification network model, the hit location information of the at least one dart pin based on the at least two dart target photographing images may include performing preprocessing on the dart target photographing image for noise removal.

Another exemplary embodiment of the present disclosure provides a dart pin hit location identification method performed by a dart game device, the dart pin hit location identification method including: obtaining at least two dart target photographing images in response to a dart pin throw, in which the dart target photographing image includes an image of a dart target and at least one dart pin hitting the dart target; and generating, by a dart pin location identification network model, hit location information of the at least one dart pin based on the at least two dart target photographing images.

Still another exemplary embodiment of the present disclosure provides a dart game device, including: a memory including computer-executable components; and a processor for executing the computer-executable components stored in the memory, in which the processor obtains at least two dart target photographing images in response to a dart pin throw, in which the dart target photographing image includes an image of a dart target and at least one dart pin hitting the dart target, and generates, by a dart pin location identification network model, hit location information of the at least one dart pin based on the at least two dart target photographing images.

The technical solutions obtainable from the present disclosure are not limited to the foregoing solutions, and other non-mentioned solution means will be clearly understood by those skilled in the art from the description below.

According to some exemplary embodiments of the present disclosure, it is possible to provide the dart game apparatus capable of increasing the interest of dart game users.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters. In other examples, well-known structures and devices are illustrated in a block diagram in order to facilitate describing one or more aspects.

DETAILED DESCRIPTION

Figure 1:
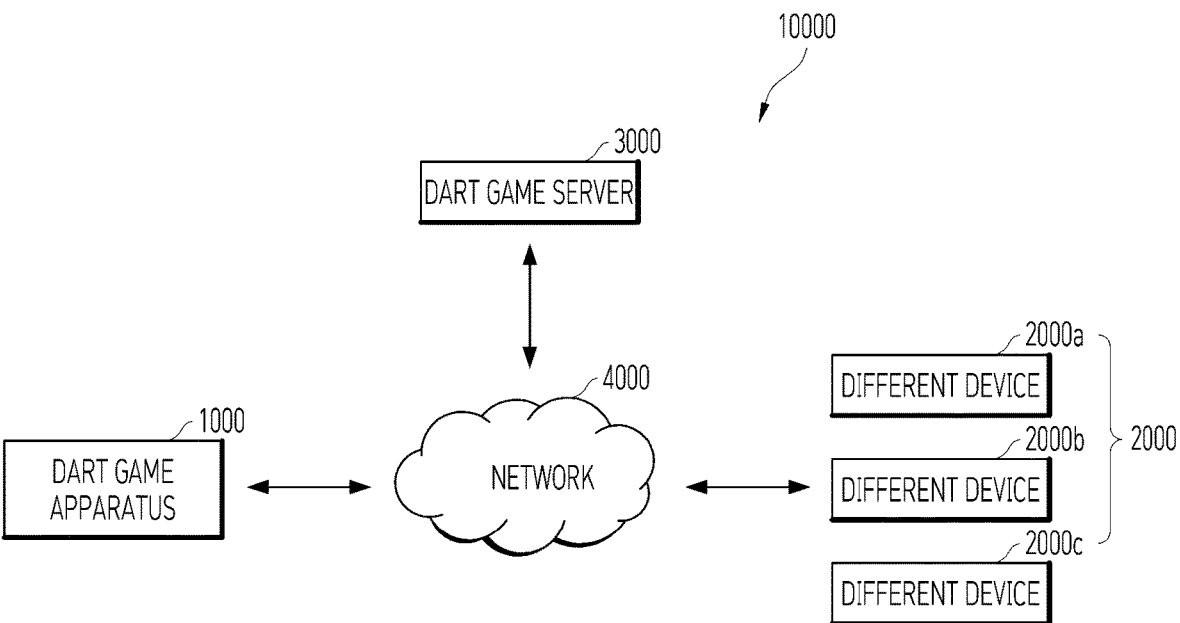
FIG. 1 is a block diagram for illustrating an example of a dart game system according to some exemplary embodiments of the disclosure.

Various embodiments and/or aspects will be now disclosed with reference to the drawings. In the following description, multiple detailed matters will be disclosed to help comprehensive appreciation of one or more aspects. However, it will also be appreciated by one skilled in the art that such aspect(s) can be embodied without the detailed matters. In the following description and the accompanying drawings, specific exemplary aspects of one or more aspects will be described in detail. However, the aspects are exemplary and some of the various methods in principles of various aspects may be used and the descriptions are intended to include all of the aspects and equivalents thereof. Specifically, in "embodiment", "example", "aspect", "illustration" and the like used in the present specification, it may not be construed that any aspect or design that will be described is more favorable or advantageous than other aspects or designs.

Hereinafter, the same reference numerals refer to the same or similar constitutional elements regardless of reference numerals, and overlapping descriptions thereof will be omitted. In addition, in describing an embodiment disclosed in the present specification, a detailed description of related known technologies will be omitted if it is determined that the detailed description makes the gist of the embodiment of the present specification unclear. Further, the accompanying drawings are only for easily understanding the embodiment disclosed in the present specification and the technical spirit disclosed by the present specification is not limited by the accompanying drawings.

Although the terms "first", "second", and the like are used for describing various devices or constitutional elements, these devices or constitutional elements are not limited by these terms. These terms are merely used for distinguishing one device or constitutional element from another device or constitutional element. Therefore, a first device or constitutional element described below may also be a second device or constitutional element in the technical idea of the present disclosure.

Unless otherwise defined, all terms (including technical and scientific terms) used in the present specification may be used as the meaning that may be commonly understood by one skilled in the art to which the present disclosure belongs. In addition, terms defined in commonly used dictionaries should not be interpreted in an idealized or excessive sense unless defined explicitly and specially.

The term "or" is intended to mean an inclusive "or" rather than an exclusive "or". That is, unless otherwise specified or clear from the context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in the present specification designates and includes all available combinations of one or more items among enumerated related items.

The terms "information" and "data" used herein may often be used interchangeably. The description "a constitutional element or layer is "on" another constitutional element or layer" includes all of cases where the constitutional element or layer is formed directly on the other constitutional element or layer, and where another constitutional element or layer is interposed therebetween. In contrast, the description "a constitutional element is "directly on" another constitutional element refers to a case where there is no intervening constitutional element or layer present.

Spatially relative terms, such as "below", "beneath", "lower", "above" and "upper" may be used herein to easily describe the relationship of one constitutional element to other constitutional element(s) as illustrated in the drawings. It should be understood that the spatially relative terms are intended to encompass different orientations of a device in use or operation, in addition to the orientation depicted in the drawings.

For example, a constitutional element described as "below" or "beneath" another constitutional element could be placed "above" another constitutional element if the constitutional element shown in the drawing is turned over. Thus, the exemplary term "below" or "beneath" may encompass both orientations of "above" and "below" or "beneath". The constitutional element may also be oriented in different directions, and the spatially relative descriptors used herein may be interpreted according to the orientations.

When it is mentioned that a certain constitutional element is "connected" or "coupled" to another constitutional element, it should be understood that the certain constitutional element may be directly connected or coupled to the other constitutional element or another intervening constitutional element may be located therebetween. Conversely, when a constitutional element is referred to as being "directly connected" or "directly coupled" to another constitutional element, it is to be understood that there is no intervening constitutional element present.

The suffixes "module" and "unit" or "part" for constitutional elements used in the following description are given or used interchangeably only for ease of writing the specification, and thus do not themselves have distinct meanings or roles. Objects and advantages of the present disclosure and technical elements for accomplishing the objects and advantages will be apparent by referring to embodiments described below in detail in connection with the accompanying drawings. In describing the present disclosure, when the detailed description of the known functions or configurations is determined as unnecessarily obscuring the gist of the present disclosure, the detailed description will be omitted. In addition, terms described below are defined in light of functions of the present disclosure, which may vary depending on a user, the intent of an operator, a convention, or the like. However, the present disclosure is not limited to the following embodiments and may be implemented in various forms. These embodiments are provided only to make the present disclosure complete and to fully inform one skilled in the art of the scope of the disclosure, and the present disclosure is only defined by the scope of the claims. Therefore, the definition should be made based on the contents throughout the present specification.

A dart game apparatus, a dart game system, and a dart game method using the dart game apparatus according to the present disclosure will be described with reference to FIGS. 1 to 10. In the meantime, in the present disclosure, for convenience of description, a player performing a dart game and a dart game apparatus playing a dart game are used interchangeably without distinguishing between them, and the accompanying drawings are intended only to facilitate an understanding of the exemplary embodiments disclosed in the present specification, and it is to be understood that the technical spirit disclosed in the present specification are not limited by the accompanying drawings and include all modifications, equivalents, or substitutions that are within the spirit and the technical range of the present disclosure.

FIG. 1 is a block diagram for illustrating an example of a dart game system according to some exemplary embodiments of the disclosure.

Referring to FIG. 1, a dart game system 10000 may include a dart game apparatus 1000, at least one different device 2000, a dart game server 3000, and a network 4000. However, the components described above are not essential to implementing the dart game system 10000, and the dart game system 10000 may have more or fewer components than those listed above.

The dart game apparatus 1000 may provide a dart game to a player who is participating in the dart game online. However, the dart game apparatus 1000 does not only provide online dart games to players, but may also provide offline dart games. Hereinafter, an example of the dart game apparatus 1000 according to the present disclosure will be described with reference to FIGS. 2 to 10.

The different device 2000 may be at least one of devices associated with the players other than the dart game apparatus 1000. For example, the different device 2000 may be a dart game apparatus other than the dart game apparatus 1000, a mobile device associated with the dart game apparatus 1000 (for example, a user's smartphone with dart game-related software installed), or a server.

For example, different device 2000a may be at least one dart game apparatus that is participating in a dart game provided by the dart game apparatus 1000, or is waiting to participate in a dart game.

In another example, different device 2000b may be a mobile device in conjunction with the dart game apparatus 1000 for presenting information regarding a dart game in which the dart game apparatus 1000 is participating to a player.

In another example, different device 2000c may be a server for providing the same dart game to a plurality of dart game apparatus. The server herein may be the same device as the dart game server 3000 illustrated in FIG. 1, or may be a different, physically separate server. However, the present disclosure is not limited thereto.

The dart game server 3000 may include, for example, any type of computer system or computer device, such as, a microprocessor, a mainframe computer, a digital processor, a handheld device, or a device controller.

In the present disclosure, the dart game server 3000 may determine dart game players to participate in an online dart game.

Specifically, the dart game server 3000 may receive first play result information from a plurality of devices participating in a first game. The dart game server 3000 may then determine a plurality of players to participate in a second game based on the first play result information. Here, the play result information may be information about the result of a dart game that is generated as the players participating in the dart game progress the dart game. The play result information may include any form of result information generated by the play of the dart game.

For example, the play result information may include at least one of information about a ranking associated with a dart game result of each of the players, information about a score associated with a dart game result of each of the players, information about an image of a player playing the dart game, information about a pre-stored image representing a player, information about the time at which each of the players ended the dart game, and identification information of each of the players who participated in the dart game. However, the present disclosure is not limited thereto.

For example, the dart game server 3000 may determine a plurality of players having a predetermined ranking as players to participate in the second dart game based on information about the ranking included in the first play result information. However, the present disclosure is not limited thereto.

In the present disclosure, the dart game server 3000 may be plural. Further, each of the plurality of dart game servers may distribute at least one dart game to the dart game apparatus 1000 or each of different devices 2000.

The dart game system 10000 formed of the single dart game server 3000 may be difficult to provide an enjoyable dart game to players due to limitations in a network, and the like. Thus, in the exemplary embodiment of the present disclosure, the plurality of dart game servers 3000 may be provided. Each of the plurality of darts game servers may distribute at least one dart game session or at least one sub-session to players. However, the present disclosure is not limited thereto.

The network 4000 may be configured regardless of its communication mode, such as a wired mode and a wireless mode, and may be configured of various communication networks, such as a Local Area Network (LAN) and a Wide Area Network (WAN).

In the present disclosure, the network 4000 or the dart game server 3000 may be a cloud-based system. Here, the could-based system is a system in which users (dart game apparatuses) share network resources, and may be a computing environment which a user borrows as much as needed and is used through the network at a desired time. The cloud-based system may include deployment models, such as public cloud, private cloud, hybrid cloud, community cloud, or service models, such as Infrastructure as a Service (IaaS), Platform as a Service (PaaS), or Software as a Service (SaaS). However, the network 4000 or the dart game server 3000 of the present disclosure is not limited to the cloud-based system, and a centralized or edge computing network 4000 or the dart game server 3000 may also be implemented according to the exemplary embodiment of the present disclosure.

According to the above-described configuration, the dart game system 10000 may include the dart game apparatus 1000, different device 2000, and the dart game server 3000 to provide a real-time dart game to a plurality of players participating in a dart game online.

On the other hand, the dart game apparatus 1000 or different device 2000 may include components that enable a player to play a dart game. Hereinafter, components of the dart game apparatus 1000 according to the present disclosure will be described with reference to FIGS. 2 and 3.

Figure 2:
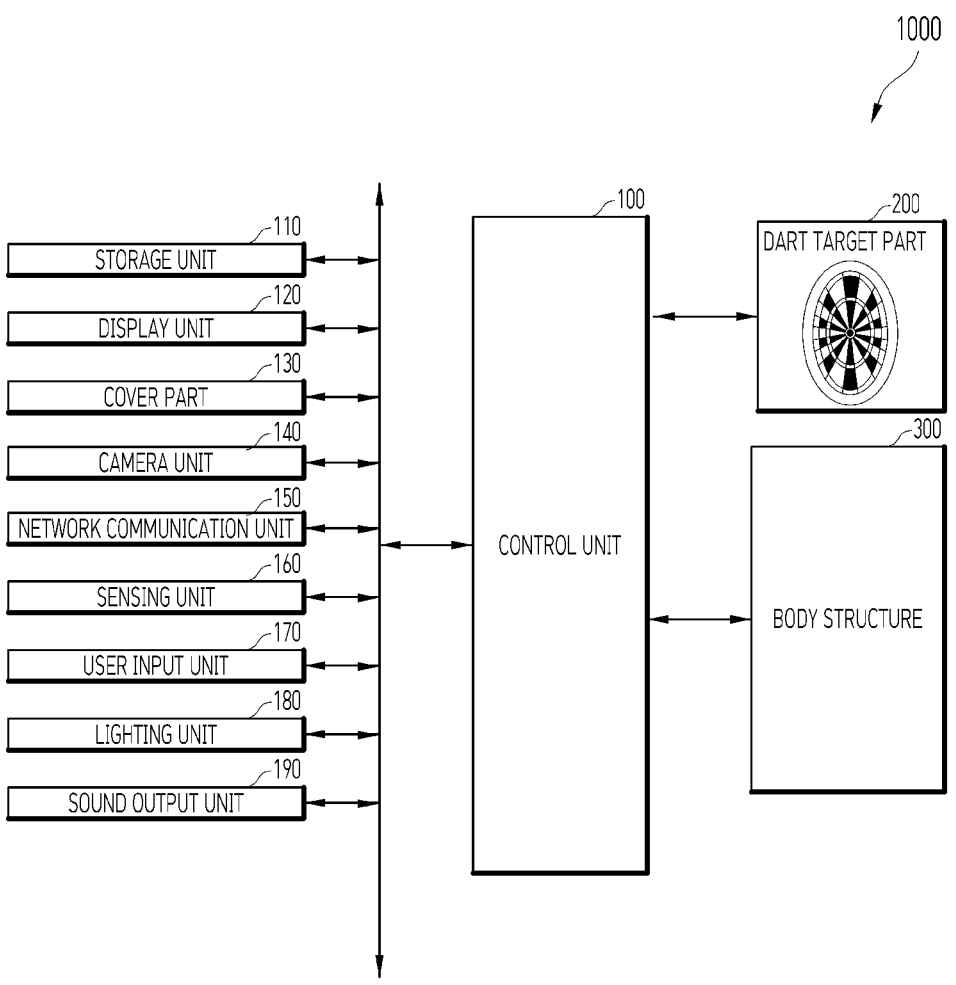
FIG. 2 is a block diagram for illustrating an example of a dart game apparatus according to some exemplary embodiments of the disclosure.
Figure 3:
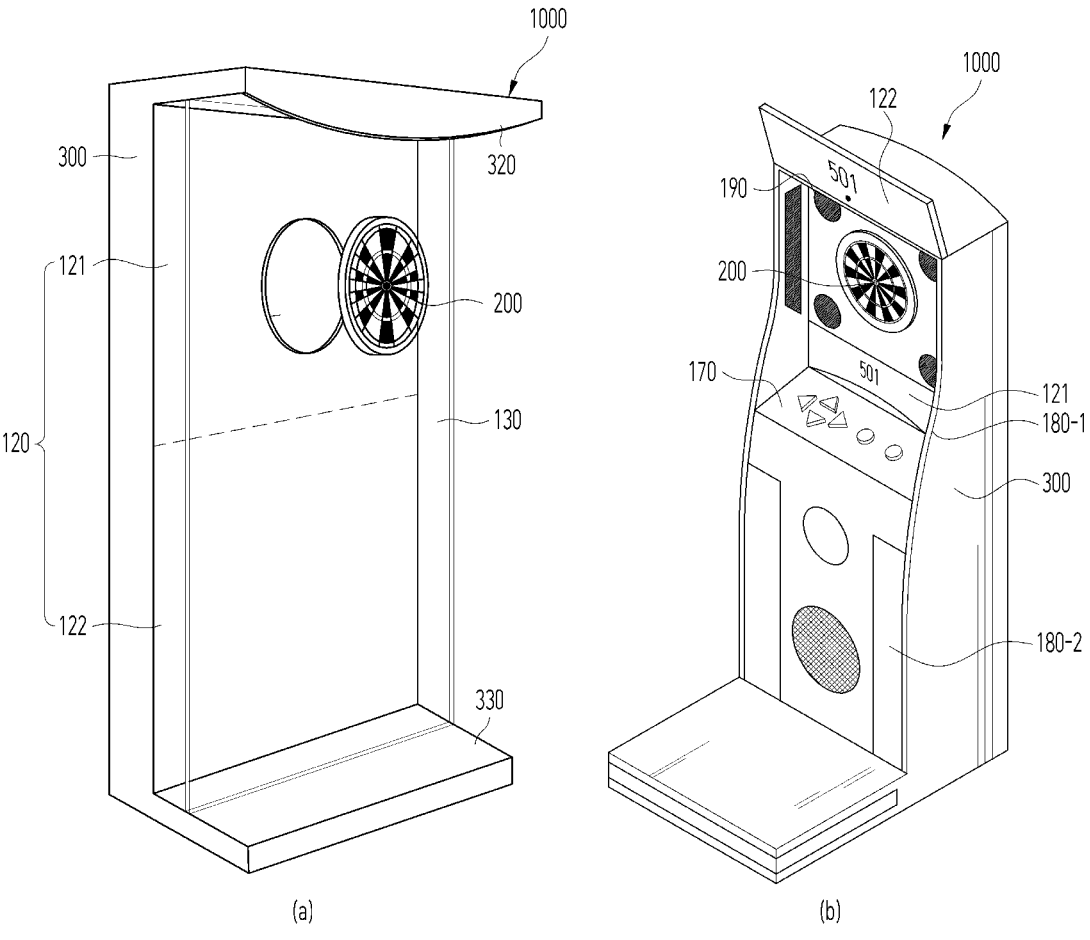
FIG. 3 is another diagram for illustrating the example of the dart game apparatus according to some exemplary embodiments of the disclosure.

FIG. 2 is a block diagram for illustrating an example of the dart game apparatus according to some exemplary embodiments of the disclosure. FIG. 3 is diagram for illustrating another example of the dart game apparatus according to some exemplary embodiments of the disclosure.

Referring to FIG. 2, the dart game apparatus 1000 may include at least one of a control unit 100, a display unit 120, a storage unit 110, a cover part 130, a camera unit 140, a network communication unit 150, a sensing unit 160, a user input unit 170, a lighting unit 180, a sound output unit 190, a dart target part 200, and a body structure 300. However, the present disclosure is not limited thereto.

The control unit 100 may generally process the overall operation of the dart game apparatus 1000. The control unit 100 may process signals, data, information, and the like that are input to or output from the components of the dart game apparatus 1000, or drive an application program stored in the storage unit 110, to process or provide appropriate information or functionality to the user.

For example, in the case of a dart game, the control unit 100 may determine a score for a player's throw of a dart pin detected by the sensing unit 160. Further, the control unit 100 may transmit the determined score to different device 2000 through the network communication unit 150. In addition, the control unit 100 may receive play-related data, including scores associated with the dart game, from different device 2000 through the network communication unit 150. Further, the control unit 100 may control the display unit 120 to display information related to the dart game on the display unit 120 based on play-related data including scores of other players and scores determined by the dart game apparatus. Here, the play-related data may be data that includes any information that is generated by a player participating in the dart game as the player progresses through the dart game, or that may be used to participate in the dart game. The play-related data may then be received again when the dart game changes.

For example, the play-related data may include at least one of identification information for each player participating in the darts game, information about the ranking associated with the dart game for each player who participated in the dart game, information about an image of a player playing the dart game, play result data for a dart game of each player participating in the dart game, information about a pre-stored image representing a player, and information about a score associated with a dart game of each of the players participating in the dart game.

In some exemplary embodiments of the present disclosure, the control unit 100 may perform a dart pin hit location identifying method. The dart pin hit location identifying method will be described in detail with reference to FIGS. 4 to 7.

In some exemplary embodiments of the present disclosure, the control unit 100 may perform a method of generating a training dataset for dart pin location identification. The method of generating a training dataset for dart pin location identification will be described in detail with reference to FIG. 8.

The storage unit 110 may include a memory and/or a persistent storage medium. The memory may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The storage unit 110 may pre-store at least one image associated with the dart game. In this case, in response to receiving the play-related data from the different device 2000 through the network communication unit 150, the control unit 100 may determine a display image associated with the play-related data among at least one pre-stored image. Then, the display unit 120 may display the determined display image.

Specifically, the information related to the dart game displayed on the display unit 120 may be a play-related image of a player of a different device 2000. When the network communication unit 150 directly receives an image photographed through the camera unit from different device 2000, the display unit 120 may display the received image.

However, depending on traffic conditions between the dart game apparatus 1000 and a different device 2000, the network communication unit 150 may only receive play-related data from a different device 2000 that does not include a play-related image. In this case, the control unit 100 may determine the display image associated with the play-related data among at least one image pre-stored in the storage unit 110 as the display image to be displayed on the display unit 120.

For example, the control unit 100 may determine that a player on a different device 2000 has hit a score corresponding to the triple area based on play-related data from different device 2000 received through the network communication unit 150. In this case, the control unit 100 may determine a display image associated with the triple among the plurality of display images pre-stored in the storage unit 110 as the display image to be displayed on the display unit 120.

According to some exemplary embodiments of the present disclosure, the storage unit 110 may store dart target photographing images or dart target photographing training images generated by the camera unit 140. For another example, the storage unit 110 may store externally received dart target photographing images or dart target photographing training images.

The display unit 120 may display (output) information processed by the dart game apparatus 1000.

For example, the display unit 120 may display information related to the dart game based on play-related data from different device 2000 received through the network communication unit 150. Here, the information related to the dart game may be an image related to a player's play on the different device 2000, or may be an image generated based on dart game play result information of the different device 2000.

The display unit 120 may be provided on the front surface of the dart game apparatus 1000.

For example, referring to (a) of FIG. 3, the display unit 120 may be provided on the front surface of the dart game apparatus 1000 to display information related to the dart game.

In the present disclosure, the display unit 120 may include a plurality of display areas. For example, the display unit 120 may include a first display area 121 and a second display area 122. Each of the first display area 121 and the second display area 122 may be independently controlled by the control unit 100. Alternatively, each of the first display area 121 and the second display area 122 may be controlled by the control unit 100 such that a single image is implemented across the first display area 121 and the second display area 122. For example, the first display area 121 and the second display area 122 may operate in the form of display modules that are independent of each other. As another example, the first display area 121 and the second display area 122 may be one module rather than separate, independent modules.

Referring to (b) of FIG. 3, the display unit 120 may be implemented as at least one display unit. Further, each of at least one display unit may be independently controlled by the control unit 100.

For example, the display unit 120 may include a first display unit located at a lower portion of the dart target part 200 and having the first display area 121 and a second display unit located at an upper portion of the dart target part 200 and having the second display area 122. Further, each of the first display unit and the second display unit may be independently controlled by the control unit 100.

The cover part 130 may be provided adjacent to the display unit 120 to protect the display unit 120.

For example, referring to (a) of FIG. 3, the cover part 130 may be positioned between a virtual side extending upwardly from a throw line and the display unit 120. In this case, the cover part 130 may be located adjacent to the display unit 120, thereby reducing the risk of breakage of the display unit 120.

Referring again to FIG. 2, the camera unit 140 may include one or more cameras. The image frames processed by the camera unit 140 may be stored in the storage unit 110 or transmitted externally through the network communication unit 150. The camera unit 140 may be equipped with two or more cameras depending on the usage environment.

In the present disclosure, the control unit 100 of the dart game apparatus 1000 may accept or reject a player's login request to the dart game apparatus 1000 based on an image including the player photographed through the camera unit 140.

For example, the control unit 100 may receive input from a player to log in the dart game apparatus 1000 through the user input unit 170. In this case, the control unit 100 may control the camera unit 140 to photograph an image that includes the player currently operating the user input unit 170. The control unit 100 may accept or reject a player's login request based on a comparison between facial information contained in the pre-stored player's identification information and facial information recognized from the photographed image.

In another example, the control unit 100 may request a user's login input through the display unit 120. The display unit 120 may, under the control of the control unit 100, output information necessary for the user to proceed with the login through camera photographing or the login through the user input unit 170.

As another example, the control unit 100 may also allow user login to the dart game apparatus 1000 through communication with the different device 2000. In this case, the control unit 100 may control the network communication unit 150 to transmit and receive information for user authentication with the different device 2000.

In this disclosure, the control unit 100 may compare the facial information recognized from the photographed image with the facial information contained in the pre-stored player's identification information after the time of the player's initial login operation.

Specifically, the control unit 100 may photograph a play image through the camera unit 140 in order to transmit a play image associated with a player of the dart game apparatus 1000 to the different device 2000. The control unit 100 may compare facial information recognized from the newly photographed play image with the facial information contained in the identification information used for the login. Based on the result of the comparison, the control unit 100 may determine whether the current player is the same player as the player at the time of login. In this case, cheating, such as the presence of surrogate players, which may occur as the dart game apparatus 1000 and different devices 2000 participate in a dart game online, may be prevented. Here, the surrogate player may be a player different from the player logged into the dart game apparatus 1000.

In another example, the control unit 100 may determine whether a player of the dart game is cheating by comparing the pre-stored play image that includes the player's play action with a current play image of the player. For example, when a dart pin projection image of a player included in the current play image differs by more than a predetermined threshold from a past dart pin projection image of the corresponding player, the control unit 100 may determine that the current dart pin projection image has a high probability of cheating. A predetermined deep learning algorithm related to image processing or image analysis may be used to compare two or more images.

In some exemplary embodiments of the present disclosure, the camera unit 140 may generate a dart target photographing image or a dart target photographing training image under control of the control unit 100.

The network communication unit 150 may be configured regardless of its communication mode, such as a wired mode and a wireless mode, and may be configured of various communication networks, such as a Local Area Network (LAN) and a Wide Area Network (WAN).

The network communication unit 150 may detect the connection state of the network with different devices 2000 or the dart game server 3000, and the transmission and reception speed of the network. However, without limitation, traffic information related to the transmission and reception speed of the network and the like may also be received from the dart game server 3000.

Data received through the network communication unit 150 may be displayed on the display unit 120, or transmitted to different device 2000.

For example, when the network communication unit 150 receives data related to the dart game from the different device 2000 or the dart game server 3000, the network communication unit 150 may transmit the received data to different device, such as a mobile device. A method of providing a dart game according to the present disclosure may allow two or more devices to participate in the same dart game. Accordingly, the player of the dart game apparatus 1000 may need to wait for one, two, or more plurality of players to participate in the same dart game. Thus, the network communication unit 150 may transmit data related to the dart game to a player's mobile device or the like. In this case, the player may check whether he/she has matched with another player through the mobile device while taking a break.

According to some exemplary embodiments of the present disclosure, the control unit 100 may provide an offline dart game to the player of the dart game apparatus 1000 when the number of players participating in the dart game is not met and the player is waiting for another player.

Specifically, the control unit 100 may receive input from a player to participate in the dart game through the user input unit 170. In this case, the control unit 100 may generate a dart game or participate in one of a plurality of pre-generated dart games. However, when the number of players on different devices 2000 is insufficient, the player on the dart game apparatus 1000 may have to wait for a match to be made. In this case, the control unit 100 may provide an offline dart game to the player of the dart game apparatus 1000 in conjunction with searching for other players so that a match can be made with another player.

According to some exemplary embodiments of the present disclosure, a dummy player may be generated by the dart game server 3000 when the number of players to participate in the dart game is insufficient. Here, the dummy player may be a virtual player rather than a real player. Then, the dart game server 3000 may make the generated dummy player participate in at least one dart game that has an insufficient number of players. For example, a dummy player may be generated based on play result data of a real player, the dummy player may perform the play in the similar form with a predetermined real player as if the real player playing with the dummy player plays a real-time dart game with a real opponent player. Hereinafter, an example of the method of generating, by the dart game server 3000, the dummy player according to the present disclosure will be described with reference to FIG. 10.

The sensing unit 160 may detect the play of the player performed for the dart target part 200. For example, the sensing unit 160 may detect a hit location of the dart pin. The sensing unit 160 may electrically convert a score corresponding to the area in which the dart was hit and transmit the converted score to the control unit 100. Further, the sensing unit 160 may transmit information about the area in which the dart pin was hit to the control unit 100, and the control unit 100 may calculate a score based on the information about the hit location of the dart pin obtained from the sensing unit 160.

For example, the sensing unit 160 may sense the pressure applied to the dart target by a thrown dart pin. In this case, the sensing unit 160 may transmit information to the control unit 100 that the sensing unit 160 has sensed the pressure applied to the dart target by the thrown dart pin. Then, the control unit 100 may control the dart target to be photographed by the camera unit 140 to detect the hit location of the dart pin. The control unit 100 may obtain information about the hit location of the dart pin by using the photographed image, and may calculate a score based on the information about the hit location of the dart pin obtained using the photographed image.

The user input unit 170 may receive user input for controlling the dart game apparatus 1000.

For example, referring to (b) of FIG. 3, the user input unit 170 may be implemented as at least one of a keypad, a dome switch, a touch pad (capacitive/static), a jog wheel, and a jog switch. However, the present disclosure is not limited thereto.

Additionally, the user input unit 170 may include a short range communication unit (not illustrated). If the user input unit 170 includes a short range communication unit of the network communication unit 150, the user input unit 170 may be configured to receive user input entered by an external console device. As short range communication technology, Bluetooth, Radio Frequency Identification (RFID), Infrared Data Association (IrDA), Ultra Wideband (UWB), ZigBee, and the like may be used.

The lighting unit 180 may be disposed on various portions of the dart game apparatus 1000 to convey a visual effect to the player of the dart game apparatus 1000.

For example, referring to (a) of FIG. 3, a first lighting unit 180-1 may be formed extending in a vertical direction along a frontward protruding portion of the body structure 300. Further, a second lighting unit 180-2 may be disposed at a front lower portion of the body structure 300. And the first lighting unit 180-1 and the second lighting unit 180-2 may output a signal to indicate the occurrence of an event in the dart game apparatus 1000. Examples of the event occurring in the dart game apparatus 1000 may include identifying a dart game player, hitting a dart, changing a dart game player, and ending a game.

The lighting units 180-1 and 180-2 may include a Light Emitting Diode (LED), so that a user may be notified of the occurrence of an event by flickering the LED. Additionally, the lighting unit 180 may vary and output the form of light emitted, the intensity of the light emitted, or the frequency of the flickering, depending on where the dart pin reaches the dart target part.

The lighting units 180-1 and 180-2 may output a preset pattern of lighting in conjunction with the acceptance of the player's login request determined by the control unit 100. Here, the lighting of the preset pattern may be predetermined from the player of the dart game apparatus 1000.

Referring again to FIG. 2, the sound output unit 190 may output audio data stored in the storage unit 110, such as game sound effects, game action instructions, and game method descriptions. Additionally, the sound output unit 190 may output sound signals associated with functions performed in the dart game apparatus 1000 (for example, game sound effects). The sound output unit 190 may include a receiver, a speaker, a buzzer, and the like. Additionally, the sound output unit 190 may vary and output a volume/type of music depending on where the dart pin has reached the dart target.

In the present disclosure, the sound output unit 190 may output a sound, music, or voice that corresponds to the play-related data among a plurality of pre-stored sounds, music, or voices based on the dart game play-related data of the player of the dart game apparatus 1000.

Specifically, the control unit 100 of the dart game apparatus 1000 may recognize data related to the player's previous play when the player's login request is accepted. The control unit 100 may control the sound output unit 190 to output a preset sound or the like based on the previous play-related data. Alternatively, when the control unit 100 accepts the player's login request, the control unit 100 may determine, based on the identification information of the player, whether a pre-stored sound, music, or voice message or the like is present. Further, when it is determined that at least one of the pre-stored sounds, music, or voice messages is present, the control unit 100 may control the sound output unit 190 to output a corresponding sound or the like.

The control unit 100 of the dart game apparatus 1000 may generate a guidance message personalized to the player based on history information related to the result of the dart game play of the player when the player's login is complete. For example, when the time of the previous play of the player is a week ago, the control unit 100 may generate a guidance message "You're logging in after a week, nice to see you." In another example, if a player has a history of winning dart game tournaments, the control unit 100 may generate a guidance message, "Welcome to the winner of XX tournament". In this way, the control unit 100 may generate personalized messages appropriate to the player from the player's history information to provide the player with a more entertaining effect.

The dart target part 200 may include a scoreboard with a bull's eye in the center, and areas (segments) separated by concentric circles centered on the bull's eye and straight lines extending radially from the bull's eye, each with an individual score. A plurality of receiving grooves (bits or holes) may be formed on the scoreboard into which the tip of the dart pin may be inserted. In this case, the scoring arrangement of the dart target part 200 and the shape of the scored areas may be varied. Additionally, the dart target part 200 may be implemented in the form of a touchscreen.

The body structure 300 may be formed to extend in a direction perpendicular to the ground to form the appearance of the dart game apparatus 1000. Further, the body structure 300 may include the display unit 120, the user input unit 170, the dart target part 200, and other components described above. However, the present disclosure is not limited thereto.

The display unit 120 provided on the front surface of the body structure 300 may display information related to the dart game. Here, the information related to the dart game may include play images of other players, images generated based on the play related data of other players, or information related to play time constraints.

Hereinafter, an example of a method of generating information related to the dart game by the control unit 100 of the dart game apparatus 1000 according to the present disclosure will be described with reference to FIGS. 4 to 7.

Figure 4:
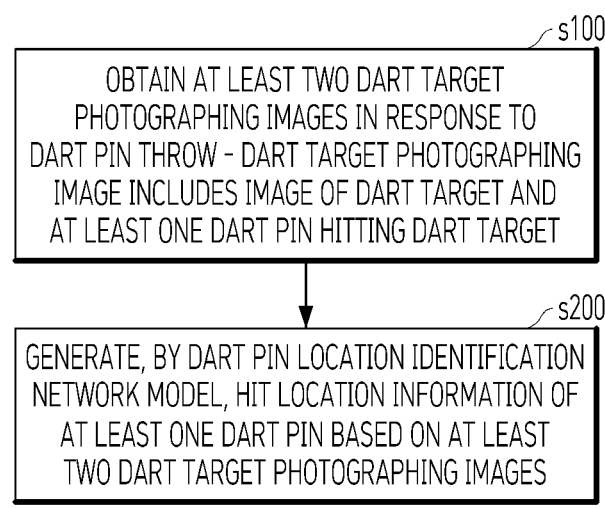
FIG. 4 is a flow diagram for illustrating an example of a dart pin hit location identification method performed by the dart game apparatus according to some exemplary embodiments of the present disclosure.

FIG. 4 is a flow diagram for illustrating an example of a dart pin hit location identification method performed by the dart game apparatus according to some exemplary embodiments of the present disclosure.

In some exemplary embodiments of the present disclosure, a dart pin hit location identification method may include obtaining at least two dart target photographing images in response to a dart pin throw (s100). Herein, the dart target photographing image may include an image of a dart target and at least one dart pin that had hit the dart target.

Specifically, the control unit 100 may recognize that an event of throwing a dart pin by a player has occurred. For example, as described above, the sensing unit 160 may sense the pressure applied to the dart target by the thrown dart pin. In this case, the sensing unit 160 may transmit information to the control unit 100 that the sensing unit 160 has sensed the pressure applied to the dart target by the thrown dart pin. In another example, the control unit 100 may recognize through the camera unit 140 that an event has occurred in which a player throws a dart pin. The control unit 100 may control the camera unit 140 to photograph the dart target to detect the hit location of the dart pin. In this case, the dart target photographing image may include an image of the dart target and at least one dart pin that had hit the dart target.

According to some exemplary embodiments of the present disclosure, at least two dart target photographing images may be generated by at least two cameras, each positioned in a predetermined direction. In this case, the number of at least two dart target photographing images may correspond to the number of at least two cameras.

More specifically, the plurality of dart target photographing images may be obtained by using the plurality of cameras so that the control unit 100 may more accurately identify a hit location of the dart pin by using the plurality of dart target images when a throw of the dart pin occurs. For example, the camera unit 140 may be a plurality of cameras, and in this case, the dart target photographing images may be a plurality of images of the dart target photographed from different directions. For example, the camera unit 140 may include two cameras installed on the left and right sides of the top of the dart game apparatus. In this case, the control unit 100 may obtain a dart target photographing image that is photographed by a camera located on the left side of the top of the dart game apparatus in a direction facing the dart target. Further, the control unit 100 may obtain a dart target photographing image that is photographed by a camera located on the right side of the top of the dart game apparatus in a direction facing the dart target. However, the present disclosure is not limited thereto, and the camera position and photographing direction may vary.

The number of dart target photographing images may correspond to the number of cameras. For example, when the number of cameras is 2, the number of dart target photographing images may be 2. For another example, the number of dart target photographing images may be an integer multiple of the number of cameras. Specifically, the plurality of cameras may photograph the dart target n times at intervals of a predetermined time to avoid obtaining only images from which the dart target and the dart pins cannot be identified due to, for example, frequent changes in lighting conditions around the dart game apparatus. In this case, the number of dart target photographing images may be n times of the number of cameras. However, the number of dart target photographing images is not limited thereto, and the dart target photographing images may be generated in various numbers by various methods.

In some exemplary embodiments of the present disclosure, the dart pin hit location identification method may include generating, by a dart pin location identification network model, hit location information of the at least one dart pin based on at least two dart target photographing images (s200).

Specifically, in the case of obtaining the dart target photographing image, the control unit 100 may generate hit location information of a dart pin identified in the dart target photographing image by using a dart pin location identification network model. In some examples, the hit location information of the dart pin may include segment location information. For example, the hit location information of the dart pin may include information that indicates the location (or scoring area) of the segment where the dart pin hit. In some examples, the hit location information of the dart pin may include information indicating the location of a bit (or receiving groove, hole) in the segment where the dart pin hit. However, the hit location information is not limited thereto, and the hit location information may include various information.

The dart pin location identification network model may be implemented by using a variety of image processing algorithms that may generate hit location information of the dart pin from the dart target photographing images. For example, the dart pin location identification network model may include a sub-model that obtains a bounding box image in which the location of the dart pin may be identified from the dart target photographing image, and a sub-model that processes the obtained bounding box image to generate hit location information of the dart pin. Additionally, the dart pin location identification network model may include a sub-model for determining hit location information of the dart pin that hits last when hit location information of multiple dart pins is obtained. However, the dart pin location identification network model is not limited thereto, and may be implemented in a variety of methods.

Hereinafter, the following describes an exemplary operation of the dart pin location identification network model that processes two or more dart target photographing images to generate hit location information of the dart pin.

In some exemplary embodiments of the present disclosure, the generating of the hit location information of the dart pin based on the at least two dart target photographing images (s200) may include generating input data by performing a merging operation on the at least two dart target photographing images, and generating hit location information of the at least one dart pin by processing the input data by the dart pin location identification network model.

As described above, the plurality of dart target photographing images may be obtained by using a plurality of cameras so that the control unit 100 may more accurately identify the hit location of the dart pin by using the plurality of dart target photographing images. For example, the control unit 100 may obtain two dart target photographing images by using two cameras by recognizing the throwing of a dart pin.

In some examples, the control unit 100 may generate two dart target photographing images as input data that may be processed by the dart pin location identification network model. For example, the control unit 100 may generate input data by performing a merging operation on at least two dart target photographing images. Specifically, for example, the control unit 100 may obtain two bounding box images corresponding to two dart target photographing images, respectively. Here, the algorithm for obtaining the bounding box image may be a variety of object detection algorithms. In some examples, various images for object detection may also be used to replace the bounding box image. Then, the control unit 100 may merge the two bounding box images into input data that is one image. In another example, the control unit 100 may merge two dart target photographing images into a single image. Then, the control unit 100 may obtain input data including two bounding box images from one image. However, the control unit 100 is not limited thereto, and the control unit 100 may generate input data in various methods.

In some exemplary embodiments of the present disclosure, the input data may be an image of at least two bounding box images disposed in a predetermined direction. For example, the input data may be an image of two bounding box images disposed vertically. However, the input data is not limited thereto, and the input data may be an image that includes a bounding box image in various methods.

The dart pin location identification network model may generate hit location information of the dart pin by processing the input data. As described above, the hit location information of the dart pin may include the location information of the segment hit by the dart pin. In addition, the hit location information of the dart pin may include information indicating the location of the bit within the segment hit by the dart pin. However, the hit location information of the dart pin is not limited thereto, and may be various.

The dart pin location identification network model may be a network model trained by using training image data including at least two dart target photographing images or at least two bounding box images, and a training dataset including a label corresponding to training image data. Here, the label may include information about the location of a segment hit by a dart pin identified from the training image data, or the location of a bit on the segment. In this case, the dart pin location identification network model may process the input data based on the at least two dart target photographing images to output hit location information including the location of the segment hit by the dart pin or the bit location of the segment. However, the dart pin location identification network model is not limited, and may be trained by using various training datasets.

In some exemplary embodiments of the present disclosure, the generating of, by the dart pin location identification network model, the hit location information of the at least one dart pin based on at least two dart target photographing images (s200) may include performing preprocessing on the dart target photographing images for noise removal.

In detail, since the dart game apparatus 1000 may be installed in various surrounding environments, a dart target photographing image may be obtained that includes a plurality of noises generated by too weak lighting, irregular lighting, and the like in the dart target photographing. In order to prevent the problem, the control unit 100 may perform preprocessing for noise removal. For example, the preprocessing for noise removal may include image filtering. For example, when an image is represented in frequency bands, high frequencies typically appear in the place where there is a lot of variation in brightness (for example, in border regions), and the general background may be expressed with low frequencies. If the high frequencies of the image are removed, a blurring effect may occur. The removal of the low frequencies of the image generates the effect that a region of an object appearing on the image may be identified. Thus, the noise removal and blurring may be performed by using a Low-Pass Filter (LPF) and a High-Pass Filter (HPF). Additionally, bilateral filtering is used to prevent the blurring effect from blurring the boundaries, so that it is possible to efficiently perform Gaussian Blur processing while preserving the boundaries.

As another example, the preprocessing for noise removal may include Gaussian Filtering. While a box filter uses a kernel composed of equal values, a Gaussian Filter may adopt a kernel using a Gaussian function. The values of the kernel matrix may be generated mathematically through a Gaussian function and applied. However, the preprocessing is not limited thereto, and may be performed in various methods.

The dart pin location identification network model may generate hit location information for a plurality of dart pins from a dart target photographing images including a plurality of dart pins. In this case, the control unit 100 may determine the hit location information of the last hit dart pin among the hit location information of the plurality of dart pins. Detailed exemplary embodiments thereof will be described below with reference to FIG. 5.

Figure 5:
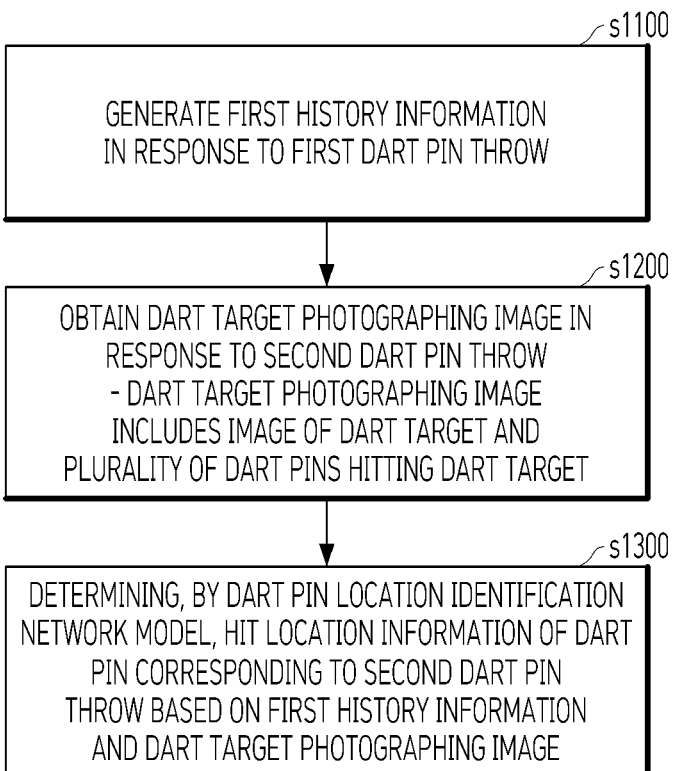
FIG. 5 is another flow diagram for illustrating the example of the dart pin hit location identification method performed by the dart game apparatus according to some exemplary embodiments of the present disclosure.

FIG. 5 is another flow diagram for illustrating the example of the dart pin hit location identification method performed by the dart game apparatus according to some exemplary embodiments of the present disclosure.

Since a dart target photographing image of a plurality of dart pins hitting a dart target does not have information about the order of the hits, the dart game apparatus of the present disclosure may identify the hit location information of the last hit dart pin by using additional information in addition to the dart target photographing image. Hereinafter, specific operations of the dart pin hit location identification method using history information will be described with reference to FIG. 5.

In some exemplary embodiments of the present disclosure, the dart pin hit location identification method may include generating first history information in response to a first dart pin throw (s1100). Here, the first history information may include at least one of a score value determined by the first dart pin throw or hit location information of the at least one dart pin hit on the dart target.

The first history information may be used to identify the order of some hits among the plurality of dart pins appearing in the dart target photographing image. For example, when the first history information is generated in response to the first dart pin throw, the first history information may be used to determine, among a plurality of hit location information, hit location information for a dart pin hit by a second dart pin throw. Here, the first dart pin throw may refer to a dart pin throw that precedes the second dart pin throw.

In some examples, the first history information may include a score value determined by the first dart pin throw. In this case, the score value determined by the first dart pin throw may be compared to the score value determined by the second dart pin throw to provide information to identify the dart pin hit by the second dart pin throw.

In some examples, the first history information may include hit location information of the dart pin that has hit the dart target. In this case, by excluding the hit location information of the dart pin that hit the dart target included in the first history information from the plurality of hit location information, the dart pin that had hit by the second dart pin throw may be identified. However, the first history information is not limited thereto, and may include a variety of information.

In some exemplary embodiments of the present disclosure, the dart pin hit location identification method may include obtaining a dart target photographing image in response to the second dart pin throw (s1200). Here, the dart target photographing image may include an image of a dart target and the plurality of dart pins that had hit the dart target.

As described in FIG. 4, the control unit 100 may recognize that the second dart pin throw has occurred by the player. In this case, the control unit 100 may control the camera unit 140 to photograph the dart target to detect the hit location of the dart pin. Since the first dart pin throw and the second dart pin throw had occurred, the dart target photographing image may include the image of the dart target and the plurality of dart pins that had hit the dart target. In this case, there may be multiple hit location information of the dart pins obtained from the dart target photographing image. In this case, the hit location information of the dart pin corresponding to the second dart pin throw may be identified using the history information, as described below.

In some exemplary embodiments of the present disclosure, the dart pin hit location identification method may include determining, by the dart pin location identification network model, hit location information of a dart pin corresponding to the second dart pin throw based on first history information and the dart target photographing image (s1300).

As described in FIG. 4, the control unit 100 may generate input data from the dart target photographing image. The input data may include a bounding box image corresponding to the dart target photographing image. For example, the control unit 100 may generate input data that includes one bounding box image obtained from one dart target image. In some examples, the dart target photographing image may include at least two images generated by at least two cameras positioned in a predetermined direction, respectively. For example, the camera unit 140 may include two cameras installed on the left and right sides of the top of the dart game apparatus. In this case, the control unit 100 may obtain a dart target photographing image that is photographed by a camera located on the left side of the top of the dart game apparatus in a direction facing the dart target. Further, the control unit 100 may obtain a dart target photographing image that is photographed by a camera located on the right side of the top of the dart game apparatus in a direction facing the dart target. However, the present disclosure is not limited thereto, and the camera position and photographing direction may vary.

For example, when two dart target photographing images are obtained, the control unit 100 may generate input data by performing a merging operation on the two dart target photographing images. Specifically, for example, the control unit 100 may obtain two bounding box images corresponding to two dart target photographing images, respectively. Here, the algorithm for obtaining the bounding box image may be a variety of object detection algorithms. In some examples, the bounding box image may be replaced with one of a variety of images for object detection. Then, the control unit 100 may merge the two bounding box images into input data that is one image. In another example, in a different order, the control unit 100 may merge two dart target photographing images into a single image. Then, the control unit 100 may obtain input data including two bounding box images from one image. However, the control unit 100 is not limited thereto, and the control unit 100 may generate input data in various methods.

According to some exemplary embodiments of the present disclosure, the input data may include an image in which at least two bounding box images are disposed in a predetermined direction, and the at least two bounding box images may correspond to at least two images generated by at least two cameras positioned in the predetermined direction.

In some examples, the input data may be an image of at least two bounding box images disposed in a predetermined direction. For example, two dart target photographing images may be obtained by at least two cameras positioned in a predetermined direction by the second dart pin throw. In this case, the input data may be the image obtained by disposing two bounding box images obtained from the two dart target photographing images top and bottom or left to right. However, the input data is not limited thereto, and the input data may be an image that includes a bounding box image in various methods.

When the input data is generated, the dart pin location identification network model may process the input data to generate hit location information for a plurality of dart pins. As described above, the hit location information of the dart pin may include the location information of the segment hit by the dart pin. In addition, the hit location information of the dart pin may include information indicating the location of the bit within the segment hit by the dart pin.

Hereinafter, the detailed operations of the exemplary dart pin location identification network model and the control unit 100 for processing the dart target photographing image including the plurality of dart pins hit the dart target will be described.

In some exemplary embodiments of the present disclosure, the determining of the hit location information of the dart pin corresponding to the second dart pin throw based on the first history information and the dart target photographing image (s1300) may include generating the hit location information of the plurality of dart pins by processing the input data based on the dart target photographing image by the dart pin location identification network model, and determining hit location information of a dart pin corresponding to the second dart pin throw among the hit location information of the plurality of dart pins generated based on the first history information.

More specifically, as described above, the dart pin location identification network model may obtain the plurality of hit location information by processing input data associated with the dart target photographing image including the plurality of dart pins that had hit the dart target. In this case, the control unit 100 may use the first history information to determine the hit location information of the dart pin that had hit by the second dart pin throw among the plurality of hit location information. For example, when the first history information includes a score value determined by the first dart pin throw, the control unit 100 may identify a dart pin that had hit by the second dart pin throw by comparing the score value determined by the first dart pin throw to the score value determined by the second dart pin throw. For another example, the control unit 100 may identify a dart pin that had hit by the second dart pin throw by excluding the hit location information of the dart pin that had hit the dart target included in the first history information from the plurality of hit location information. However, the present disclosure is not limited thereto, and the control unit 100 may determine the hit location information of the dart pin corresponding to the second dart pin throw by using the first history information in various methods.

In some exemplary embodiments of the present disclosure, the determining of the hit location information of the dart pin corresponding to the second dart pin throw based on the first history information and the dart target photograph- ing image (s1300) may include generating the hit location information of the dart pin corresponding to the second dart pin throw by processing the input data including the first history information by the dart pin location identification network model.

In detail, instead of obtaining the plurality of hit location information and then post-processing the obtained hit loca- tion information by using the first history information by using the dart pin location identification network model, the first history information may be input to the dart pin location identification network model in the form of discrete data. For example, when the dart pin location identification net- work model is a deep learning model that includes an input layer, a hidden layer, and an output layer, the first history information may be input as input data to the input layer of the dart pin location identification network model. In another example, the first history information may be entered as input data into one of the plurality of hidden layers. In this case, the dart pin location identification network model may output only the hit location information of the dart pin corresponding to the second dart pin throw among the plurality of hit location information. For another example, the dart pin location identification network model may additionally output information for identifying the hit location information of the dart pin corresponding to the second dart pin throw. However, the dart pin location identification network model is not limited thereto, and the dart pin location identification network model may process the first history information as input data in various methods.

According to some exemplary embodiments of the pres- ent disclosure, the dart pin hit location identification method may further include generating second history information in response to the second dart pin throw.

Similar to the first history information, the second history information may be used to identify the hit location infor- mation of the last hit dart pin among the plurality of dart pins appearing in the dart target photographing image. For example, when the second history information is generated in response to the second dart pin throw, the second history information may be used to determine, among a plurality of hit location information, hit location information for a dart pin hit by a third dart pin throw. Here, the third dart pin throw may refer to a dart pin throw that follows the second dart pin throw.

Same as or similar to the first history information, the second history information may include a score value deter- mined by the first dart pin throw. Further, the second history information may include hit location information of a dart pin that hit the dart target. The second history information may be used to determine hit location information of a dart pin hit by the third dart pin throw in a manner similar to the first history information as described above. However, the second history information is not limited thereto, and may include a variety of information.

Figure 6A:
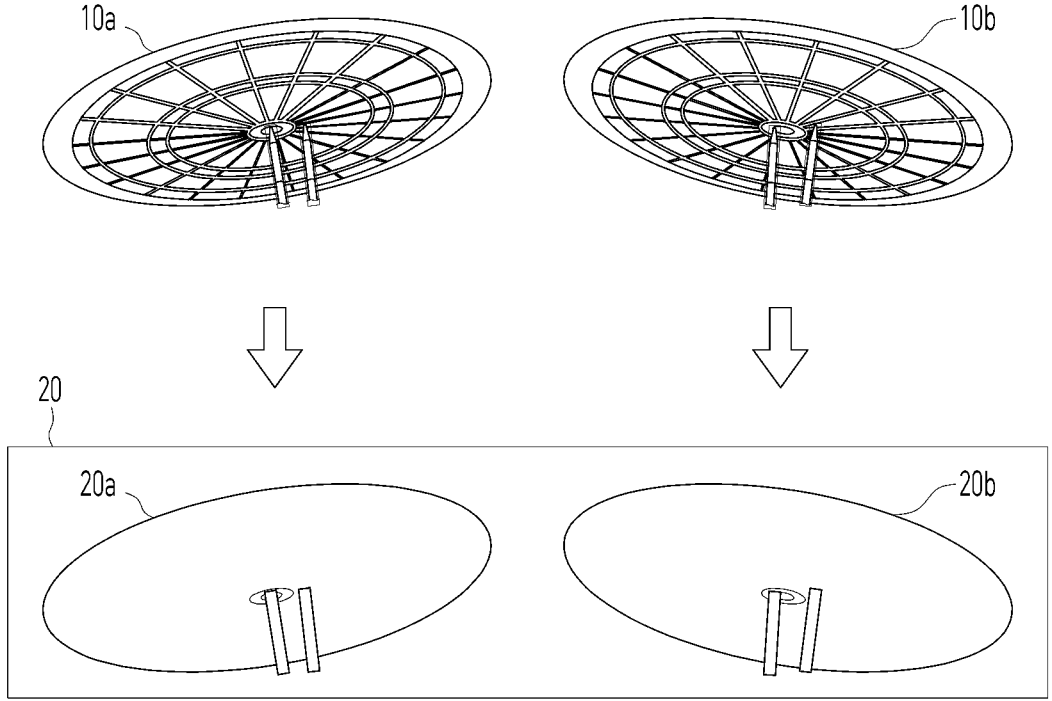
FIGS. 6A-6B are diagrams for illustrating a dart target photographing image.
Figure 6B:
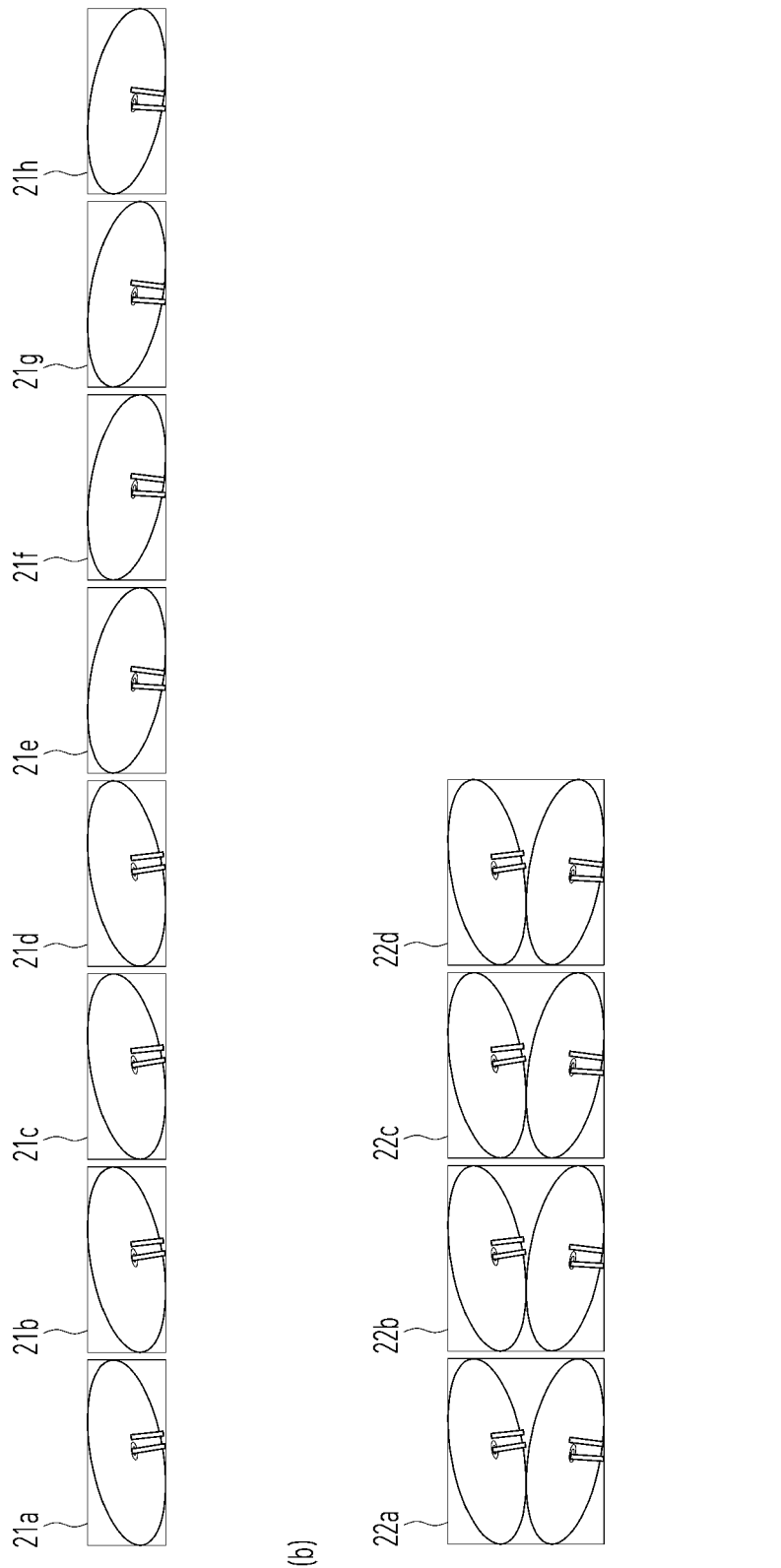

FIGS. 6A-6B are diagrams for illustrating a dart target photographing image.

As described above, a dart target photographing image 10 may include an image of a dart target and at least one dart pin that had hit the dart target. Referring to FIG. 6A, the control unit 100 may obtain a dart target photographing image 10a photographed by the camera located on the left side of the top of the dart game apparatus in response to the dart pin throw in the direction facing the dart target, and a dart target photographing image 10b photographed by the camera located on the right side of the top of the dart game apparatus in the direction facing the dart target.

In this case, the control unit 100 may generate the input data by performing a merging operation on the two dart target photographing images. Specifically, for example, the control unit 100 may obtain two bounding box images 20*a* and 20*b* corresponding to the two dart target photographing images, respectively. Here, the algorithm for obtaining the bounding box image may be a variety of object detection algorithms. In some examples, various images for object detection may also be used to replace the bounding box image. The control unit 100 may then merge the two bounding box images 20*a* and 20*b* into a single image, input data 20. For another example, the control unit 100 may merge the two dart target photographing images 10*a* and 10*b* into a single image. Then, the control unit 100 may obtain the input data 20 including the two bounding box images 20*a* and 20*b* from one image. However, the control unit 100 is not limited thereto, and the control unit 100 may generate input data in various methods.

Referring now to FIG. 6B, eight bounding box images 21*a* to 21*h* are illustrated in (a), and input data 22*a* to 22*d* in which eight bounding box images 21*a* to 21*h* are merged into pairs corresponding to one dart pin throw are illustrated in (b). For example, when the bounding box images corresponding to the first dart pin throw are an image 21*a* and an image 21*e*, the input data in which the two bounding box images are merged may be input data 22*a*. Similarly, when the bounding box images corresponding to the first dart pin throw are an image 21*b* and an image 21*f*, the input data in which the two bounding box images are merged may be input data 22*b*.

Figure 7A:
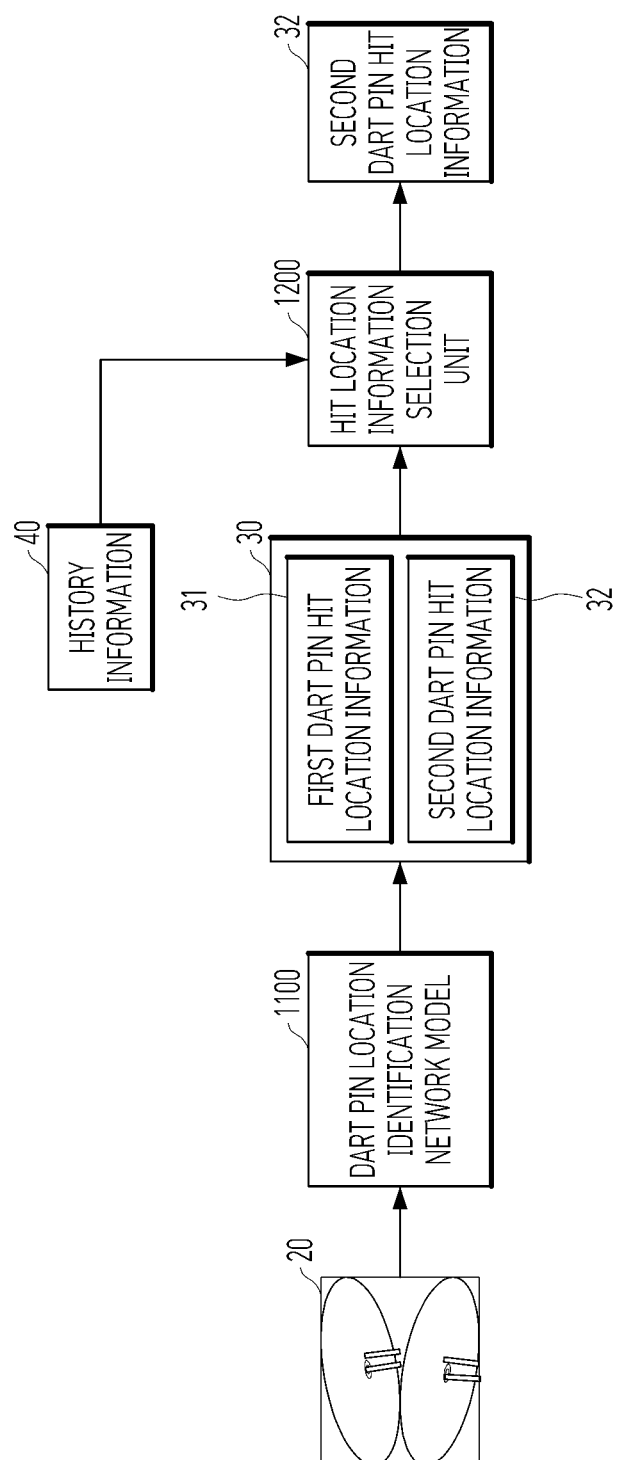
FIGS. 7A-7B are diagrams for illustrating an example of a dart pin hit location identification model according to some exemplary embodiments of the present disclosure.
Figure 7B:
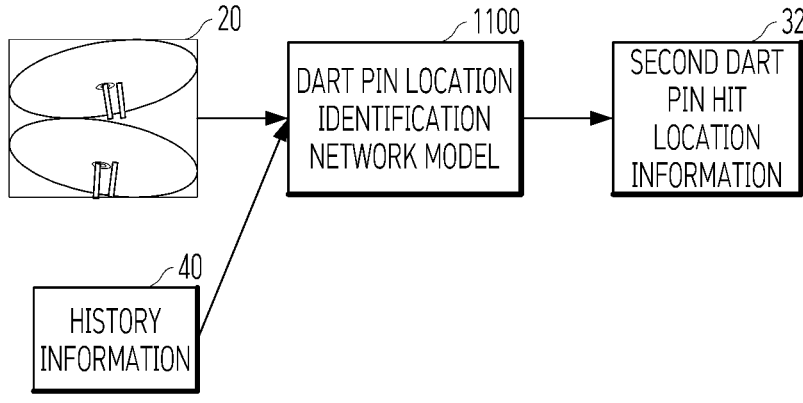

FIGS. 7A-7B are diagrams for illustrating an example of a dart pin location identification network model 1100 according to some exemplary embodiments of the present disclosure.

Referring to FIG. 7A, the control unit 100 may determine the hit location information of the most recently thrown dart pin by obtaining a plurality of hit location information by using the dart pin location identification network model and then post-processing the obtained hit location information by using the first history information. For example, the dart pin location identification network model may process the input data 20 including an image representing two dart pins to generate hit location information 31 of the plurality of dart pins. Here, the input data may be obtained from two dart target photographing images obtained in response to the second dart pin throw occurring subsequent to the first dart pin throw. For example, the hit location information 30 of the plurality of dart pins may include first dart pin hit location information 31 corresponding to the first dart pin throw and second dart pin hit location information 32 corresponding to the second dart pin throw. In this case, a hit location information selection unit 1200 may determine hit location information 32 corresponding to the most recent throw (for example, the second dart pin throw) among the hit location information 30 of the plurality of dart pins by using history information 40.

In some example, the history information may include various information for identifying hit location information of the last hit dart pin among the plurality of dart pins appearing in the dart target photographing image. For example, when the first history information 40 is generated in response to the first dart pin throw, the first history information may be used to determine the hit location information 32 of the dart pin that had hit by the second dart pin throw from the plurality of hit location information 30.

In some examples, the first history information 40 generated in response to the first dart pin throw may include a score value determined by the first dart pin throw. In this case, the hit location information selection unit 1200 may determine the second dart pin hit location information 32 from the plurality of hit location information 30 by comparing a score value determined by the first dart pin throw to a score value determined by the second dart pin throw.

In some examples, the first history information 40 may include hit location information of the dart pin that had hit the dart target. In this case, the hit location information selection unit 1200 may determine the second dart pin hit location information 32 by excluding the hit location information of the dart pin that had hit the dart target included in the first history information from the plurality of hit location information 30.

The hit location information selection unit 1200 may be implemented as a simple computational model, or may be implemented as a network model. However, the hit location information selection unit 1200 is not limited thereto, and the hit location information selection unit 1200 may be implemented in a variety of methods.

Referring to FIG. 7B, instead of obtaining the plurality of hit location information by using the dart pin location identification network model and then post-processing the obtained hit location information by using the first history information 40, the control unit 100 may determine the second dart pin hit location information 32 from the plurality of hit location information by inputting the first history information 40 into the dart pin location identification network model 1100 in the form of discrete data. For example, when the dart pin location identification network model 1100 is a deep learning model that includes an input layer, a hidden layer, and an output layer, the first history information 40 may be input into the input layer of the dart pin location identification network model 1100. For another example, the first history information may be entered into one of a plurality of hidden layers. In this case, the dart pin location identification network model 1100 may output only the second dart pin hit location information 32 from the plurality of hit location information, or may additionally output information capable of identifying the second dart pin hit location information 32.

Figure 8:
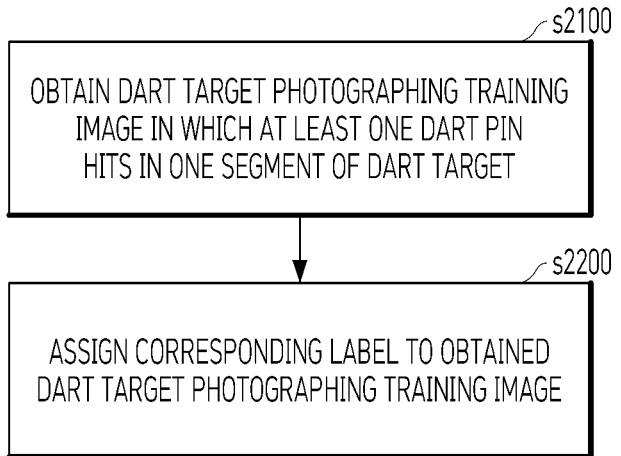
FIG. 8 is a flow diagram for illustrating an example of a method of generating a training dataset for the dart pin hit location identification method performed by a computing device according to some exemplary embodiments of the present disclosure.

FIG. 8 is a flow diagram for illustrating an example of a method of generating a training dataset for the dart pin hit location identification method performed by a computing device according to some exemplary embodiments of the present disclosure.

The dart pin location identification network model 1100 needs to be trained by using a sufficient amount of training datasets so that the dart pin location identification network model 1100 may more accurately identify the hit location of the dart pin by using the plurality of dart target photographing images corresponding to the dart pin throw. In some examples, the dart target part 200 may include a scoreboard including a bullseye and regions (segments) separated by straight lines extending radially from the bullseye, each with an individual score. Each segment may include a plurality of receiving grooves (bits or holes) into which the tip of the dart may be inserted. In this case, the hit location of the dart pin may be determined by identifying a segment location or a bit location on the segment. In particular, since there are a finite number of segments and a finite number of bits on a segment, the location of the dart pins may be specified in a finite number of methods.

The method of generating a training dataset for the dart pin location identification of the present disclosure may obtain a plurality of dart target photographing training images while changing the number of dart pins hit and the hit locations of the dart pins on the dart target part 200 that includes a scoreboard having a finite number of dart pin locations. Thus, the method of generating a training dataset for dart pin location identification of the present disclosure may generate a sufficient amount of training datasets. Further, a sufficient amount of training datasets may be generated by obtaining dart target photographing training images in various environments in which the dart game apparatus 1000 may be located. The methods of generating the training dataset for dart pin location identification of the present disclosure may be performed by a variety of computing devices, including the dart game apparatus 1000, at least one different device 2000, and the dart game server 3000.

Hereinafter, a method of generating a training dataset for training the dart pin location identification network model 1100 will be described in detail.

In some exemplary embodiments of the present disclosure, the method for generating the training dataset for dart pin location identification may include obtaining a dart target photographing training image in which at least one dart pin hit one segment of the dart target (s2100). Here, the plurality of segments included in the dart target may each include a predetermined number of bits.

As described with reference to FIGS. 4 to 7, the dart pin location identification network model 1100 may be implemented by using various image processing algorithms that may generate hit location information for dart pins from the dart target photographing image. In some examples, the dart pin location identification network model may generate hit location information for one or more dart pins by processing input data based on a plurality of dart target photographing images obtained from multiple angles. However, without limitation, the dart pin location identification network model may generate hit location information of one or more dart pins by processing input data based on one dart target photographing image. Hereinafter, the method of generating the training dataset associated with the dart pin location identification network model 1100 using the dart target photographing images including two or more images will be described. However, without limitation, the method according to the present disclosure may be applied to generate a training dataset associated with the dart pin location identification network model 1100 utilizing a single dart target photographing image.

As described above, the dart target may be divided into segments, each with its own individual score. Furthermore, each segment may have a plurality of bits (or holes, receiving grooves) that each dart pin may hit. In this case, the number of hit locations where the dart pin may hit may be limited to the total number of bits included in the plurality of segments. Thus, a sufficient amount of dart target photographing training images may be obtained by changing the bit location where the dart pin hit.

In some exemplary embodiments of the present disclosure, the obtaining of the dart target photographing training image in which at least one dart pin hit one segment of the dart target (s2100) may include obtaining a first dart target photographing training image of the first dart pin hitting a first bit included in a first segment of the dart target, and obtaining a second dart target photographing training image of the first dart pin hitting a second bit included in a first segment of the dart target.

More specifically, multiple dart target photographing training images may be obtained by changing the bit hit by the dart pin in a single segment. For example, when the first segment includes the first bit and the second bit which are different from each other, the first dart target photographing training image may be obtained by photographing the dart target hit by the first dart pin on the first bit of the first segment. Then, the second dart target photographing training image may be obtained by removing the first dart pin from the first bit of the first segment, and photographing the dart target hit by the first dart pin on the second bit of the first segment. Herein, the first dart pin may be one or more same or similar dart pins, and does not necessarily mean a single dart pin. Compared to the first dart target photographing training image, the second dart target photographing training image may be an image with different hit locations of one dart pin in one segment.

In some exemplary embodiments of the present disclosure, the obtaining of the dart target photographing training image in which at least one dart pin hits in one segment of the dart target (s2100) may include obtaining a third dart target photographing training image of the first dart pin hitting on a third bit included in a second segment of the dart target.

In detail, by changing the location of the segment hit by the dart pin, multiple dart target photographing training images may be obtained. As in the example described above, the first dart target photographing training image may be obtained by photographing the dart target that has hit the first dart pin on the first bit of the first segment. Then, the third dart target photographing training image may be obtained by removing the first dart pin from the first bit of the first segment, and photographing the dart target hit by the first dart pin on the third bit of the second segment. In this case, compared to the first dart target photographing training image, the third dart target photographing training image may be an image with different hit location of one dart pin on the two segments.

In some exemplary embodiments of the present disclosure, the obtaining of the dart target photographing training image in which at least one dart pin hit one segment of the dart target (s2100) may further include obtaining a fourth dart target photographing training image in which the first dart pin hits on the first bit included in the first segment of the dart target and the second dart pin hits on the second bit included in the first segment of the dart target.

More specifically, the dart target photographing training image may be obtained for two dart pins hit on two different bits included in one segment. For example, the fourth dart target photographing training image may be obtained by photographing the dart target hit by the second dart pin on the second bit included in the first segment of the dart target in the state where the first dart pin hits the first bit included in the first segment of the dart target. In this case, the fourth dart target photographing training image may be an image with an additional hit location of one dart pin in one segment compared to the first dart target photographing training image.

In some exemplary embodiments of the present disclosure, the obtaining of the dart target photographing training image in which at least one dart pin hits in one segment of the dart target (s2100) may further include obtaining a fifth dart target photographing training image in which the first dart pin hits on the first bit included in the first segment of the dart target and the second dart pin hits on a fourth bit included in the first segment of the dart target.

More specifically, a dart target photographing training image may be obtained by moving one of two hit dart pins that had hit on two different bits included in one segment. For example, as in the example described above, the fourth dart target photographing training image may be obtained by photographing the dart target hit by the second dart pin on the second bit included in the first segment of the dart target in the state where the first dart pin hits on the first bit included in the first segment of the dart target. In this case, the fifth dart target photographing training image may be obtained by photographing a dart target in which the second dart pin hit on the second bit included in the first segment of the dart target is moved to the fourth bit included in the first segment, while the first dart pin remains as it is. In this case, the fifth dart target photographing training image may be an image in which the hit location of one of the two dart pins has changed within one segment compared to the fourth dart target photographing training image.

In some exemplary embodiments of the present disclosure, the obtaining of the dart target photographing training image in which at least one dart pin hit one segment of the dart target (s2100) may include obtaining a sixth dart target photographing training image in which the first dart pin hits on the first bit included in the first segment of the dart target and the second dart pin hits on a third bit included in the second segment of the dart target.

More specifically, a dart target photographing training image may be obtained for two dart pins hit on two different segments. In the example described above, the first dart target photographing training image may be obtained by photographing the dart target hitting the first dart pin on the first bit of the first segment. Further, the sixth dart target photographing training image may be obtained by photographing the dart target hit by the second dart pin on the third bit included in the second segment of the dart target, while the first dart pin remains on the first bit of the first segment as it is. In this case, the sixth dart target photographing training image may be an image with one additional hit location of one dart pin on a different segment compared to the first dart target photographing training image.

In some exemplary embodiments of the present disclosure, the obtaining of the dart target photographing training image in which at least one dart pin hit one segment of the dart target (s2100) may include obtaining a seventh dart target photographing training image in which the first dart pin hits on the first bit included in the first segment of the dart target and the second dart pin hits on a fifth bit included in the second segment of the dart target.

More specifically, a dart target photographing training image may be obtained by moving one of two dart pins that had hit on two different segments. In the example described above, the sixth dart target photographing training image may be obtained by photographing the dart target hit by the second dart pin on the third bit included in the second segment of the dart target, while the first dart pin remains on the first bit of the first segment as it is. In this case, a seventh dart target photographing training image may be obtained by photographing the dart target in which the second dart pin is moved to the fifth bit included in the second segment from the third bit included in the second segment of the dart target while the first dart pin remains on the first bit of the first segment as it is. In this case, the seventh dart target photographing training image may be an image in which the hit location of one dart pin in one segment is changed compared to the sixth dart target photographing training image.

According to some exemplary embodiments of the present disclosure, the obtaining of the first dart target photographing training image of the first dart pin hitting the first bit included in the first segment of the dart target may include obtaining the first dart target photographing training image under a first photographing environment condition; and obtaining the first dart target photographing training image under a second photographing environment condition.

More specifically, the surrounding environment in which the dart game apparatus 1000 is located may have a variety of environments. In this case, the training dataset may include images generated under a variety of photographing environmental conditions so that the dart pin location identification network model 1100 is better able to process images photographed in different surrounding environments.

For example, the first photographing environment condition may have relatively bright lighting. Further, the second photographing environment condition may have relatively dim lighting. By photographing without changing the hit location of the dart pin under two different conditions, multiple dart target photographing training images may be obtained that differ only in the photographing environment conditions.

In another example, the dart target photographing training image that differs only in the photographing environment conditions may be obtained by post-processing the dart target photographing training image under different conditions. For example, by adjusting the brightness of the dart target photographing training image, multiple dart target photographing training images may be obtained that differ only in the photographing environment conditions. However, the present disclosure is not limited thereto, and the dart target photographing training images may be obtained in various methods.

According to some exemplary embodiments of the present disclosure, the dart pin hit location identification method may further include assigning a label corresponding to the obtained dart target photographing training image (s2200). Here, the label may be determined based on the location of the segment hit by the dart pin. Further, the label may be determined based on the segment location and the bit location on the segment.

When the dart target photographing training image is obtained, a label corresponding to the dart target photographing training image may be assigned. For example, when the dart target photographing training image includes an image of a dart pin that hits on the first bit of the first segment, the label corresponding to the dart target photographing training image may be information indicating the first segment. In another example, the label corresponding to the dart target photographing training image may be information indicating the first segment and the bit location on the first segment. Here, labeling may be understood as the action of associating the dart target photographing training image with the corresponding label and storing dart target photographing training image and the corresponding label. In this way, a training data set may be generated by generating multiple pairs consisting of dart target photographing training images and labels. However, the present disclosure is not limited thereto, and the label corresponding to the dart target photographing training image may be assigned in a variety of methods.

In a further example, the label corresponding to the dart target photographing training image may include a bounding box image. As a further example, the label corresponding to the dart target photographing training image may further include history information. The training dataset in which the label includes history information may be used to train the dart pin location identification network model 1100 exemplified in FIG. 7B.

According to some exemplary embodiments of the present disclosure, the dart target photographing training image may include at least two images corresponding to one label, and at least two images corresponding to one label may be generated by at least two cameras, each positioned in a predetermined direction.

As described above, the dart pin location identification network model may generate hit location information for one or more dart pins by processing input data based on a plurality of dart target photographing images obtained from multiple angles. In this case, the training dataset for training the dart pin location identification network model may include a plurality of dart target photographing images obtained from multiple angles, and one label corresponding to the plurality of dart target photographing images. For example, a plurality of dart target photographing training images obtained from multiple angles may be obtained by using at least two cameras positioned in predetermined directions. In this case, the training dataset may be suitable for a dart game apparatus including at least two cameras positioned in predetermined directions. However, the present disclosure is not limited thereto, and the dart target photographing training image may be generated in a variety of methods.

In some examples, where the dart pin location identification network model 1100 processes input images generated from two or more dart target photographing images, the first dart target photographing training image to the seventh dart target photographing training image may be two or more images, each generated by two cameras. For example, the number of dart target photographing training images may correspond to the number of cameras. In some examples, when the number of cameras is two, the number of dart target photographing training images may be two. As another example, the number of dart target photographing training images may be an integer multiple of the number of cameras. Specifically, for example, multiple cameras may take photographs of the dart target n time at intervals of a predetermined time. In this case, the number of dart target photographing training images may be n times the number of cameras. However, the present disclosure is not limited thereto, and the dart target photographing training images may be generated in any number of various methods.

Figure 9:
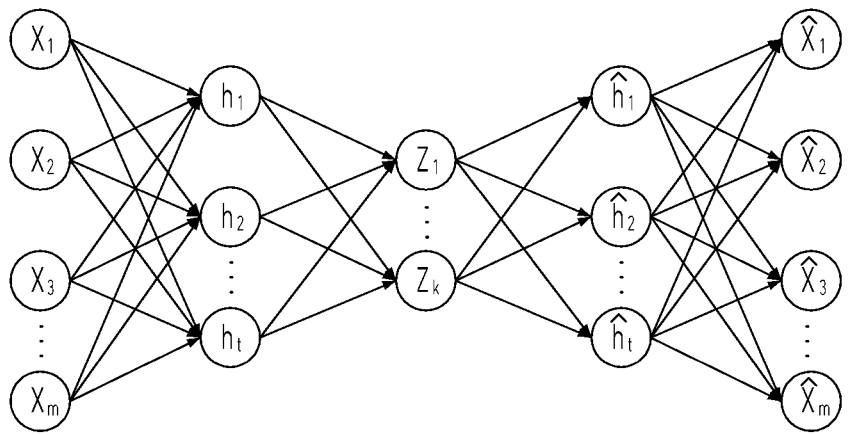
FIG. 9 is a schematic diagram illustrating a network function according to some exemplary embodiments of the present disclosure.

FIG. 9 is a conceptual diagram illustrating a network function according to an exemplary embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes. As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, a Siamese network, a transformer, and the like. The foregoing description of the deep neural network is merely illustrative, and the present disclosure is not limited thereto.

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In order to increase the amount of training data for training the neural network, various data augmentation methods may be used. For example, data augmentation may be performed through two-dimensional transformations such as rotation, scale, shearing, reflection, and translation. In addition, data augmentation may be performed by utilizing noise insertion, color, brightness transformation, and the like.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 10:
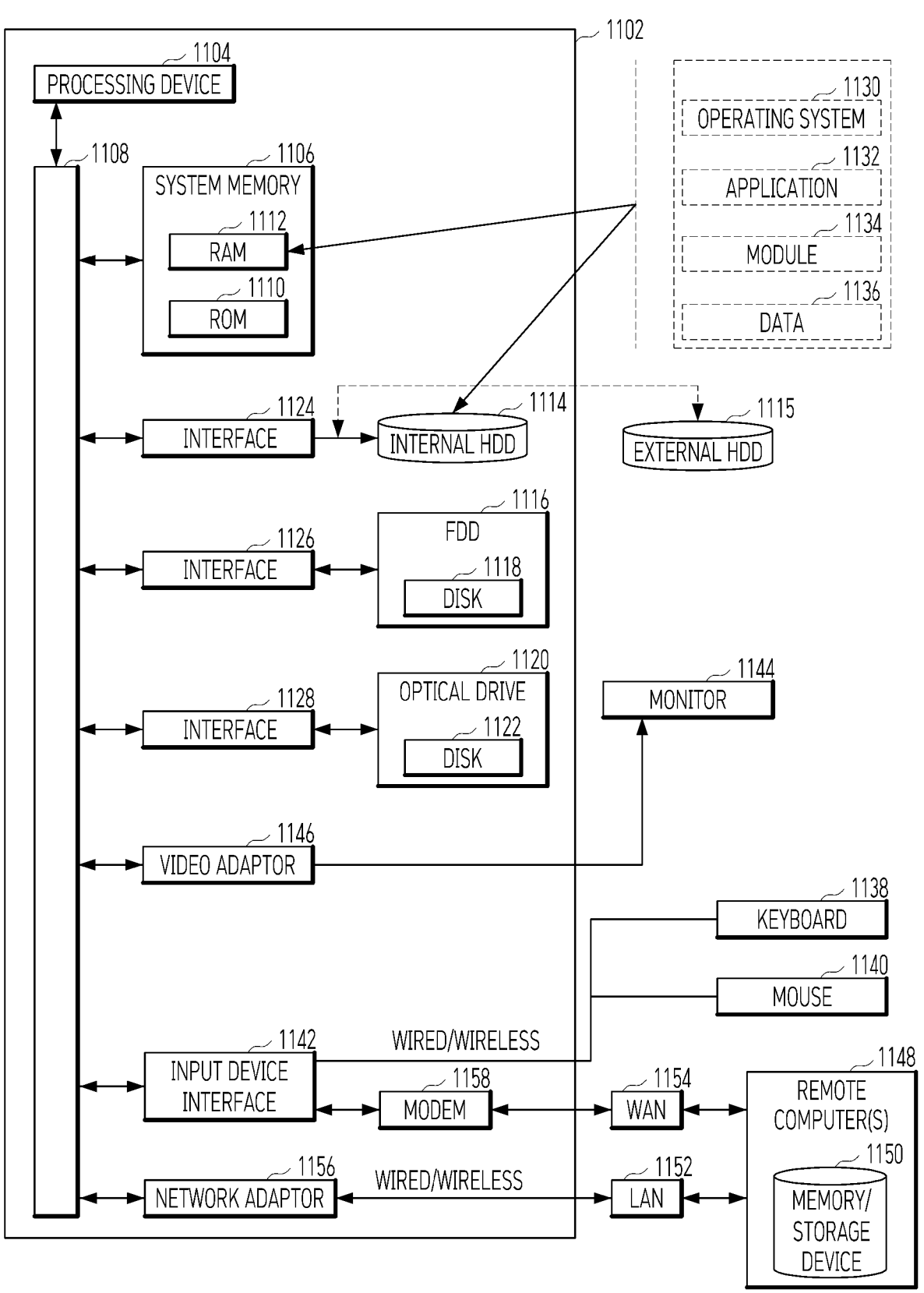
FIG. 10 is a brief and general schematic diagram illustrating an example of a computing environment in which the exemplary embodiments of the present disclosure may be implemented.

FIG. 10 is an exemplary flowchart illustrating a video retrieval method according to an exemplary embodiment of the present disclosure.

In the exemplary embodiment of the present disclosure, the video retrieval method may include an operation S100 of receiving retrieval query data for one or more video data. In the exemplary embodiment of the present disclosure, the video retrieval method may include an operation S200 of generating a retrieval query vector based on the received retrieval query data.

In the exemplary embodiment of the present disclosure, the video retrieval method may include an operation S300 of comparing video retrieval vectors for a plurality of retrieval target video data configuring the one or more video data with the retrieval query vector.

In the exemplary embodiment of the present disclosure, the operation S300 of the comparing includes an operation S310 of calculating a similarity score between the retrieval query vector and the video retrieval vector.

In the exemplary embodiment of the present disclosure, the video retrieval method may include an operation S400 of selecting one or more retrieval target video data based on a result of the comparison.

In the exemplary embodiment of the present disclosure, the operation S400 of the selecting includes an operation S410 of identifying a first video retrieval vector having the highest similarity score to the retrieval query vector among the plurality of video retrieval vectors.

In the exemplary embodiment of the present disclosure, the operation S400 of the selecting includes an operation S420 of identifying one or more second video retrieval vectors having a similarity score of a predetermined threshold value or more based on a similarity score of the first video retrieval vector with the retrieval query vector.

In the exemplary embodiment of the present disclosure, the operation S400 of the selecting includes an operation S430 of identifying video retrieval vectors generated based on retrieval target video data adjacent in time with the first video retrieval vector among the one or more identified second video retrieval vectors.

In the exemplary embodiment of the present disclosure, the operation S400 of the selecting includes an operation S440 of selecting retrieval target video data corresponding to the first video retrieval vector and the identified second video retrieval vector.

The foregoing operations of the video retrieval method are simply present for description, and some operations may be omitted or a separate operation may be added. Further, the operations of the foregoing video retrieval method may be performed according to a predetermined order.

FIG. 14 is a general schematic diagram illustrating an example of a computing environment in which the exemplary embodiments of the present disclosure contents are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a micro-processor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 4100 including a computer 4102 and implementing several aspects of the present disclosure is illustrated, and the computer 4102 includes a processing device 4104, a system memory 4106, and a system bus 4108. The system bus 4108 connects system components including the system memory 4106 (not limited) to the processing device 4104. The processing device 4104 may be a predetermined processor among various commonly used processors. A dual processor and other multi-processor architectures may also be used as the processing device 4104.

The system bus 4108 may be a predetermined one among several types of bus structure, which may be additionally connectable to a local bus using a predetermined one among a memory bus, a peripheral device bus, and various common bus architectures. The system memory 4106 includes a ROM 4110, and a RAM 4112. A basic input/output system (BIOS) is stored in a non-volatile memory 4110, such as a ROM, an erasable and programmable ROM (EPROM), and an EEPROM, and the BIOS includes a basic routine helping a transport of information among the constituent elements within the computer 4102 at a time, such as starting. The RAM 4112 may also include a high-rate RAM, such as a static RAM, for caching data.

The computer 4102 also includes an embedded hard disk drive (HDD) 4114 (for example, enhanced integrated drive electronics (EIDE) and serial advanced technology attachment (SATA))—the embedded HDD 4114 being configured for exterior mounted usage within a proper chassis (not illustrated)—a magnetic floppy disk drive (FDD) 4116 (for example, which is for reading data from a portable diskette 4118 or recording data in the portable diskette 4118), and an optical disk drive 4120 (for example, which is for reading a CD-ROM disk 4122, or reading data from other high-capacity optical media, such as a DVD, or recording data in the high-capacity optical media). A hard disk drive 4114, a magnetic disk drive 4116, and an optical disk drive 4120 may be connected to a system bus 4108 by a hard disk drive interface 4124, a magnetic disk drive interface 4126, and an optical drive interface 4128, respectively. An interface 4124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 4102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 4130, one or more application programs 4132, other program modules 4134, and program data 4136 may be stored in the drive and the RAM 4112. An entirety or a part of the operation system, the application, the module, and/or data may also be cached in the RAM 4112. It will be well appreciated that the present disclosure may be implemented by several commercially usable operation systems or a combination of operation systems.

A user may input a command and information to the computer 4102 through one or more wired/wireless input devices, for example, a keyboard 4138 and a pointing device, such as a mouse 4140. Other input devices (not illustrated) may be a microphone, an IR remote controller, a joystick, a game pad, a stylus pen, a touch screen, and the like. The foregoing and other input devices are frequently connected to the processing device 4104 through an input device interface 4142 connected to the system bus 4108, but may be connected by other interfaces, such as a parallel port, an IEEE 1394 serial port, a game port, a USB port, an IR interface, and other interfaces.

A monitor 4144 or other types of display devices are also connected to the system bus 4108 through an interface, such as a video adaptor 4146. In addition to the monitor 4144, the computer generally includes other peripheral output devices (not illustrated), such as a speaker and a printer.

The computer 4102 may be operated in a networked environment by using a logical connection to one or more remote computers, such as remote computer(s) 4148, through wired and/or wireless communication. The remote computer(s) 4148 may be a work station, a computing device computer, a router, a personal computer, a portable computer, a microprocessor-based entertainment device, a peer device, and other general network nodes, and generally includes some or an entirety of the constituent elements described for the computer 4102, but only a memory storage device 4150 is illustrated for simplicity. The illustrated logical connection includes a wired/wireless connection to a local area network (LAN) 4152 and/or a larger network, for example, a wide area network (WAN) 4154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 4102 is used in the LAN networking environment, the computer 4102 is connected to the local network 4152 through a wired and/or wireless communication network interface or an adaptor 4156. The adaptor 4156 may make wired or wireless communication to the LAN 4152 easy, and the LAN 4152 also includes a wireless access point installed therein for the communication with the wireless adaptor 4156. When the computer 4102 is used in the WAN networking environment, the computer 4102 may include a modem 4158, is connected to a communication computing device on a WAN 4154, or includes other means setting communication through the WAN 4154 via the Internet. The modem 4158, which may be an embedded or outer-mounted and wired or wireless device, is connected to the system bus 4108 through a serial port interface 4142. In the networked environment, the program modules described for the computer 4102 or some of the program modules may be stored in a remote memory/storage device 4150. The illustrated network connection is illustrative, and those skilled in the art will appreciate well that other means setting a communication link between the computers may be used.

The computer 4102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

In the meantime, according to an exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include data pre-processed by the processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may also include all or a predetermined combination of preprocessed data for processing by the neural network, data input to the neural network, a weight of the neural network, a hyper-parameter of the neural network, data obtained from the neural network, an active function associated with each node or layer of the neural network, and a loss function for training of the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network. (in the present specification, weights and parameters may be used with the same meaning.) Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user.

The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system.

Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Therefore, the present disclosure is not limited to the exemplary embodiments presented herein, and shall be interpreted in the broadest range consistent with the principles and the new characteristics presented herein.

What is claimed is:

1. A computer program stored in a computer-readable storage medium, the computer program providing a dart pin hit location identification method when being executed by one or more control units of a dart game device including at least two cameras, each positioned in a predetermined direction, the method comprising:

obtaining at least two dart target photographing images in response to a dart pin throw, wherein the dart target photographing image includes an image of a dart target and at least one dart pin hitting the dart target, and the at least two dart target photographing images are generated by at least two cameras, each positioned in the predetermined direction; and generating, by a dart pin location identification network model, hit location information of the at least one dart pin based on the at least two dart target photographing images, wherein the generating of the hit location information of the dart pin based on the at least two dart target photographing images includes:

generating input data that is a single image by performing a merging operation on the at least two dart target photographing images, wherein the merging operation comprises (i) obtaining a bounding box image for each of the at least two dart target photographing images, and (ii) merging the bounding box images to create the single image; and generating the hit location information of the at least one dart pin by processing the input data by the dart pin location identification network model.

2. The computer program of claim 1, wherein the input data includes at least two bounding box images corresponding to the at least two dart target photographing images.

3. The computer program of claim 2, wherein the input data is an image of the at least two bounding box images arranged in predetermined directions.

4. The computer program of claim 1, wherein the dart pin location identification network model is trained by using a training dataset including training image data including at least two dart target photographing images or at least two bounding box images, and a label corresponding to the training image data.

5. The computer program of claim 4, wherein the label corresponding to the training image data includes at least one of segment location information or segment bit location information.

6. The computer program of claim 1, wherein the number of the at least two dart target photographing images corresponds to the number of the at least two cameras.

7. The computer program of claim 1, wherein the generating of, by the dart pin location identification network model, the hit location information of the at least one dart pin based on the at least two dart target photographing images includes performing preprocessing on the dart target photographing image for noise removal.

8. A dart pin hit location identification method performed by a dart game device including at least two cameras, each positioned in a predetermined direction, the dart pin hit location identification method comprising:

obtaining at least two dart target photographing images in response to a dart pin throw, wherein the dart target photographing image includes an image of a dart target and at least one dart pin hitting the dart target, and the at least two dart target photographing images are generated by at least two cameras, each positioned in the predetermined direction; and generating, by a dart pin location identification network model, hit location information of the at least one dart pin based on the at least two dart target photographing images, wherein the generating of the hit location information of the at least one dart pin based on the at least two dart target photographing images includes:

generating input data that is a single image by performing a merging operation on the at least two dart target photographing images, wherein the merging operation comprises (i) obtaining a bounding box image for each of the at least two dart target photographing images, and (ii) merging the bounding box images to create the single image; and generating the hit location information of the at least one dart pin by processing the input data by the dart pin location identification network model.

9. A dart game device including at least two cameras, each positioned in a predetermined direction, the dart game device comprising:

a memory including computer-executable components; and a processor for executing the computer-executable components stored in the memory, wherein the processor obtains at least two dart target photographing images in response to a dart pin throw, wherein the dart target photographing image includes an image of a dart target and at least one dart pin hitting the dart target, and the at least two dart target photographing images are generated by at least two cameras, each positioned in the predetermined direction, and generates, by a dart pin location identification network model, hit location information of the at least one dart pin based on the at least two dart target photographing images, and when the hit location information of the dart pin is generated based on the at least two dart target photographing images, the processor generates input data that is a single image by performing a merging operation on the at least two dart target photographing images, wherein the merging operation comprises (i) obtaining a bounding box image for each of the at least two dart target photographing images, and (ii) merging the bounding box images to create the single image, and generates the hit location information of the at least one dart pin by processing the input data by the dart pin location identification network model.

* * * * *